(12) United States Patent
Takaki et al.

(10) Patent No.: US 11,939,928 B2
(45) Date of Patent: Mar. 26, 2024

(54) EGR CONTROL METHOD AND EGR CONTROLLER

(71) Applicant: NISSAN MOTOR CO., LTD., Yokohama (JP)

(72) Inventors: Daisuke Takaki, Kanagawa (JP); Hirofumi Tsuchida, Kanagawa (JP); Takayuki Hamamoto, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 50 days.

(21) Appl. No.: 17/639,470

(22) PCT Filed: Sep. 6, 2019

(86) PCT No.: PCT/IB2019/001021
§ 371 (c)(1),
(2) Date: Mar. 1, 2022

(87) PCT Pub. No.: WO2021/044178
PCT Pub. Date: Mar. 11, 2021

(65) Prior Publication Data
US 2022/0268222 A1 Aug. 25, 2022

(51) Int. Cl.
*F02D 21/08* (2006.01)
*F02D 9/02* (2006.01)
(Continued)

(52) U.S. Cl.
CPC ......... *F02D 21/08* (2013.01); *F02D 41/0007* (2013.01); *F02D 41/0065* (2013.01);
(Continued)

(58) Field of Classification Search
CPC .. F02D 21/08; F02D 41/0007; F02D 41/0065; F02D 41/1446; F02D 41/145;
(Continued)

(56) References Cited

U.S. PATENT DOCUMENTS 10,465,622 B2 * 11/2019 Yonekura ............... F02M 26/06
2008/0295514 A1 * 12/2008 Ono ..................... F02D 41/0235
60/602

(Continued)

FOREIGN PATENT DOCUMENTS

EP  1 808 591 A2  7/2007
EP  3 511 558 A1  7/2019
(Continued)

OTHER PUBLICATIONS

Extended European Search Report issued in corresponding EP Application No. 19943859.9 dated Aug. 25, 2022 (8 pages).

*Primary Examiner* — Phutthiwat Wongwian
*Assistant Examiner* — Susan E Scharpf
(74) *Attorney, Agent, or Firm* — Foley & Lardner LLP

(57) ABSTRACT

An EGR valve is provided in an EGR passage circulating a part of an exhaust gas of an exhaust pipe in an intake pipe as an EGR gas, the EGR valve adjusting an EGR gas amount flowing in the EGR passage when an engine is in an EGR region, a differential pressure device is provided in the intake pipe, the differential pressure device adjusting a differential pressure of the EGR valve, a control unit is provided to control the EGR valve and the differential
(Continued)

pressure device, and the EGR control method includes switching whether to adjust the EGR gas amount using the EGR valve and the differential pressure device or to adjust the EGR gas amount using the EGR valve only on the basis of an exhaust gas pressure of an inlet portion of the EGR passage.

8 Claims, 14 Drawing Sheets

(51) Int. Cl.
 *F02D 41/00* (2006.01)
 *F02D 41/14* (2006.01)
 *F02M 26/06* (2016.01)
 *F02M 26/10* (2016.01)

(52) U.S. Cl.
 CPC ....... *F02D 41/1446* (2013.01); *F02D 41/145* (2013.01); *F02M 26/06* (2016.02); *F02M 26/10* (2016.02); *F02D 2009/024* (2013.01); *F02D 2041/0017* (2013.01); *F02D 41/005* (2013.01); *F02D 41/0072* (2013.01)

(58) Field of Classification Search
 CPC ............... F02D 41/005; F02D 41/0072; F02D 2009/024; F02D 2041/0017; F02M 26/06; F02M 26/10; Y02T 10/12
 See application file for complete search history.

(56) References Cited

U.S. PATENT DOCUMENTS

| | | | |
|---|---|---|---|
| 2011/0313634 A1* | 12/2011 | Yasui | F02D 41/1402 701/102 |
| 2014/0261312 A1* | 9/2014 | Ueno | F02D 41/0002 123/337 |
| 2014/0298802 A1* | 10/2014 | Suzuki | F02D 21/08 60/602 |
| 2017/0260919 A1* | 9/2017 | Surnilla | F02D 41/2464 |
| 2018/0274499 A1* | 9/2018 | Ueno | F02D 41/1448 |
| 2018/0320612 A1* | 11/2018 | Ulrey | F02D 13/0203 |
| 2019/0234328 A1* | 8/2019 | Yonekura | F02D 41/1446 |

FOREIGN PATENT DOCUMENTS

| | | | |
|---|---|---|---|
| JP | 2007-211767 A | 8/2007 | |
| JP | 2016-56802 A | 4/2016 | |
| JP | 2016-89784 A | 5/2016 | |
| WO | WO-2018047248 A1 * | 3/2018 | ............ F02B 37/186 |

* cited by examiner

EGR CONTROL METHOD AND EGR CONTROLLER

TECHNICAL FIELD

The present invention relates to an EGR control method and an EGR controller.

BACKGROUND ART

JP2007-211767A discloses a technique that detects a differential pressure of an EGR valve with a differential pressure sensor to control an EGR valve opening degree such that the detected differential pressure corresponds to a predetermined target differential pressure.

SUMMARY OF INVENTION

In the technique described in JP2007-211767A, there lies a problem that an actual EGR rate deviates from a target EGR rate because an EGR valve differential pressure detected by a differential pressure sensor is affected by a pulsation of an exhaust gas pressure to cause a difficulty in accurately detecting the differential pressure of the EGR valve and lower a control accuracy of an EGR valve opening degree.

An object of the present invention is to provide an EGR controller that ensures controlling an EGR rate to achieve a target EGR rate without using a differential pressure sensor.

According to an aspect of the present invention, an EGR valve is provided in an EGR passage circulating a part of an exhaust gas of an exhaust pipe in an intake pipe as an EGR gas, the EGR valve adjusting an EGR gas amount flowing in the EGR passage when an engine is in an EGR region, a differential pressure device is provided in the intake pipe, the differential pressure device adjusting a differential pressure of the EGR valve, a control unit is provided to control the EGR valve and the differential pressure device, and the EGR control method includes switching whether to adjust the EGR gas amount using the EGR valve and the differential pressure device or to adjust the EGR gas amount using the EGR valve only on the basis of an exhaust gas pressure of an inlet portion of the EGR passage.

DESCRIPTION OF EMBODIMENTS

The following describes an embodiment of the present invention on the basis of the drawings.

Figure 1:
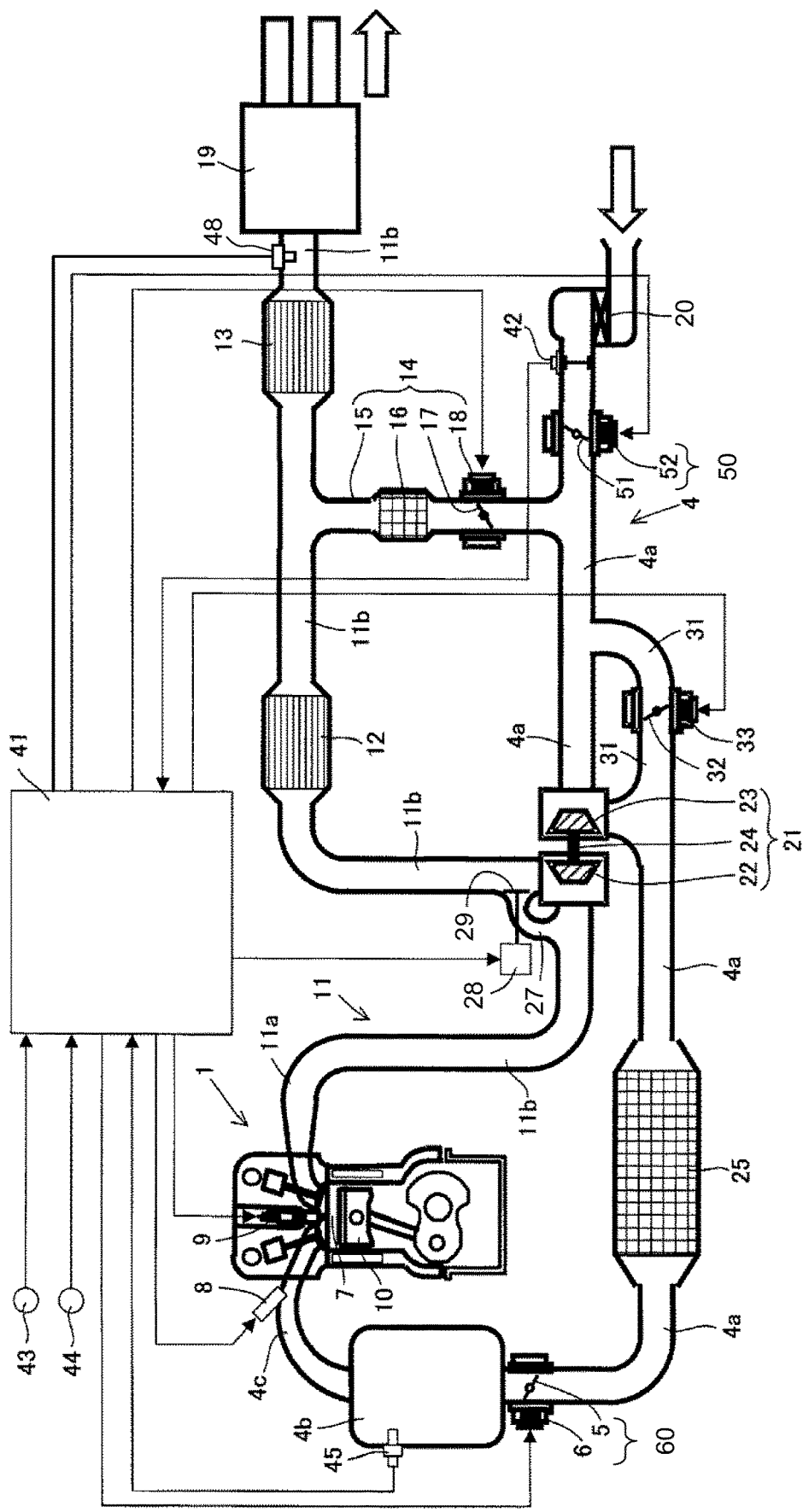
FIG. 1 is a schematic configuration diagram of an EGR controller of an internal combustion engine according to an embodiment of the present invention.

FIG. 1 is a schematic configuration diagram of an EGR controller of an internal combustion engine according to the embodiment of the present invention.

An engine 1 as an internal combustion engine is configured of a gasoline engine, and functions as a driving force source of a vehicle. The engine 1 is configured by including a cylinder 7 (a combustion chamber), a fuel injection valve 8, a spark plug 9, and a piston 10. The engine 1 includes an intake passage 4 and an exhaust passage 11.

The intake passage 4 is configured by including an intake pipe 4a, an intake collector 4b, and an intake manifold 4c.

The intake pipe 4a includes an air filter 20, a differential pressure device 50, a turbo supercharger 21, an intercooler 25, and a throttle device 60 from an upstream side.

The differential pressure device 50 is configured of a metering valve 51 and an actuator 52, and controls a front-and-back differential pressure of an LP-EGR valve by adjusting an opening area of the intake pipe 4a as described later.

The turbo supercharger 21 is configured of a turbine 22, a compressor 23, and a rotation shaft 24, and supercharges an intake air by an exhaust gas rotating the compressor 23 as described later. The intercooler 25 cools the air compressed by the compressor 23.

The throttle device 60 is configured of a throttle valve 5 and a motor 6, and is operated responding to a depressed amount of an accelerator pedal depressed by a driver to adjust an intake air amount supplied to the engine 1. After being stored in the intake collector 4b, the adjusted air is distributed and supplied to the cylinder 7 of each cylinder via the intake manifold 4c. The intake air is mixed with a fuel injected from the fuel injection valve 8 and transmitted to each cylinder, and is combusted by the spark plug 9 igniting a fire. The exhaust gas after the combustion is discharged from the exhaust passage 11.

The exhaust passage 11 is configured by including an exhaust manifold 11a and an exhaust pipe 11b.

The turbo supercharger 21 is disposed in the exhaust pipe 11b in a downstream side of the exhaust manifold 11a. A manifold catalyst 12 is disposed in the exhaust pipe 11b and a main catalyst 13 is disposed in the exhaust pipe 11b in a downstream side with respect to the manifold catalyst 12. The exhaust gas that has passed through the main catalyst 13 is discharged via a muffler 19. A temperature sensor 48 that detects an exhaust temperature is disposed in the exhaust pipe 11b in an immediate downstream of the main catalyst 13.

The exhaust pipe 11b includes a bypass passage 27 that bypasses the turbine 22 and a normally-closed wastegate valve 29 that opens and closes the bypass passage 27. The wastegate valve 29 is driven by a motor 28. For example, when an actual supercharging pressure detected by a supercharging pressure sensor 45 become higher than a target supercharging pressure, the wastegate valve 29 controls to open the wastegate valve 29 by driving of the motor 28 to bypass a part of the exhaust gas flowing into the turbine 22 so as to match the actual supercharging pressure with the target supercharging pressure.

Meanwhile, the intake pipe 4a includes a bypass passage 31 that bypasses the compressor 23. In the bypass passage 31, a recirculation valve 32 driven by a motor 33 is disposed. When the throttle valve 5 is suddenly closed, the recirculation valve 32 recirculates a pressurized air confined in the intake pipe 4a between the throttle valve 5 and the compressor 23 to an upstream side of the compressor 23, and thus, prevents a pressure increase between the throttle valve 5 and the compressor 23.

Between the exhaust pipe 11b and the intake pipe 4a, a low-pressure loop EGR unit 14 (hereinafter referred to as an "LP-EGR unit 14") for performing an exhaust gas recirculation (EGR) is disposed. The LP-EGR unit 14 is configured by including an EGR passage 15, an EGR cooler 16, an LP-EGR valve 17, and a motor 18 that drives the LP-EGR valve 17.

The EGR passage 15 branches from a downstream of the turbine 22, more specifically, the exhaust pipe 11b between the manifold catalyst 12 and the main catalyst 13, and joins together to an upstream of the compressor 23, more specifically, the intake pipe 4a between the compressor 23 and the differential pressure device 50 (described below). In the EGR passage 15, the EGR cooler 16 is disposed to cool the exhaust gas flowing in the EGR passage 15.

An engine controller 41 is configured by including a microcomputer and a storage device, such as a ROM and a RAM. The engine controller 41 achieves the later-described control by performing a program stored in the storage device.

More specifically, the engine controller 41 is input with signals from an air flow meter 42, an accelerator sensor 43, a crank angle sensor 44, the supercharging pressure sensor 45, the temperature sensor 48, and the like, and controls the motor 6, the motor 18, the motor 28, the motor 33, and the actuator 52 on the basis of these signals to control the operation of the engine 1 and control the LP-EGR unit 14.

Next, a control performed by the engine controller 41 will be described.

Figure 2:
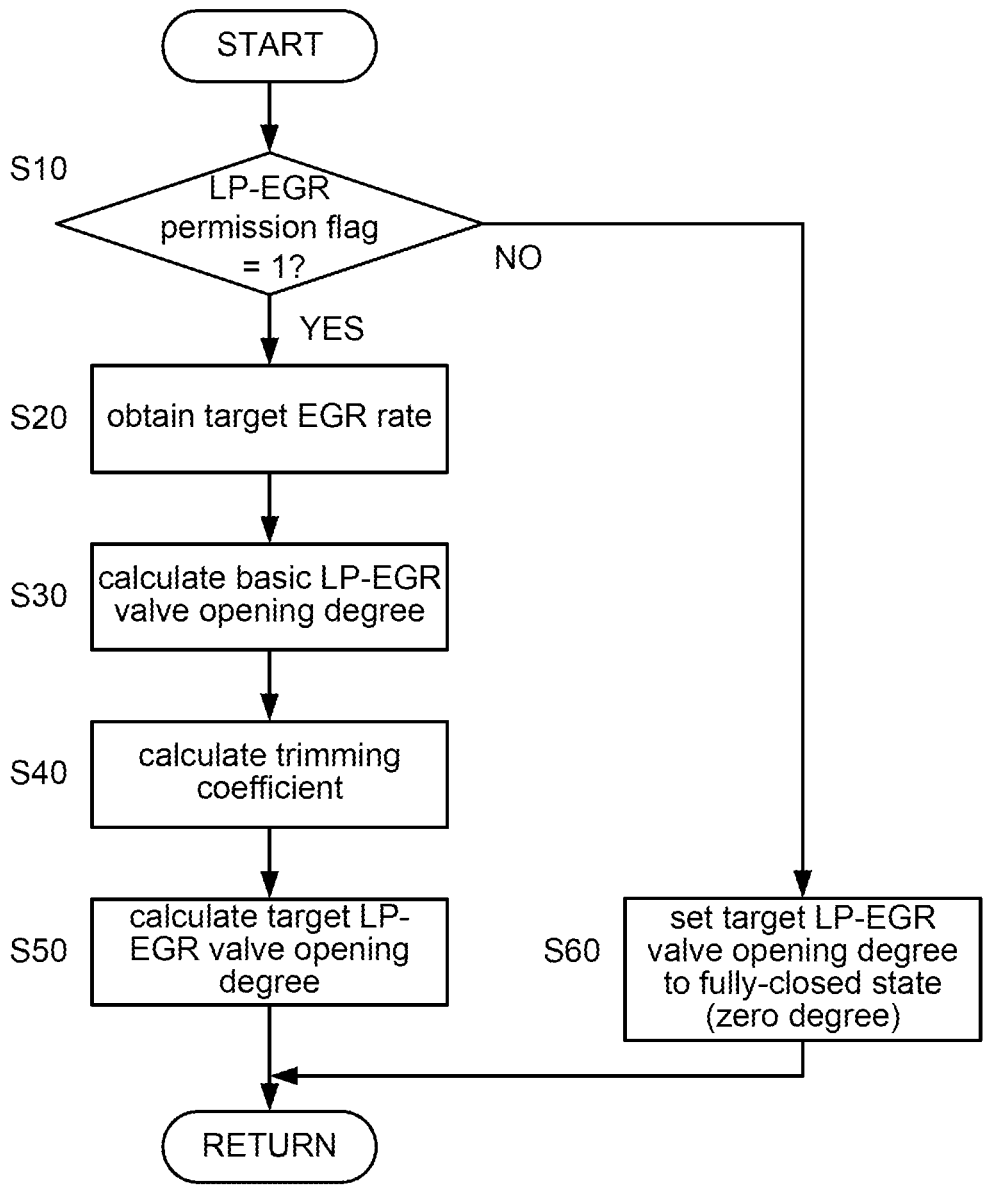
FIG. 2 is a flowchart of a calculation of a target LP-EGR valve opening degree according to the embodiment of the present invention.

FIG. 2 is a flowchart of a calculation of a target LP-EGR valve opening degree performed by the engine controller 41 according to this embodiment. the flowchart illustrated in FIG. 2 is performed at a predetermined interval (for example, every 10 ms).

The engine controller 41, first, determines whether an LP-EGR permission flag is set to 1 or not (step S10). The LP-EGR permission flag is a flag that is initially set to 0 at a start of the engine 1 and is set to 1 when a current engine operating state of the engine (hereinafter, referred to as an "engine operating point") determined from a revolution speed Ne and an engine load of the engine is in an LP-EGR region from a target EGR rate map illustrated in FIG. 3. When it is determined that the LP-EGR permission flag is set to 1, the procedure transitions to step S20. When it is determined that the LP-EGR permission flag is set to 0, the procedure transitions to step S60.

Figure 3:
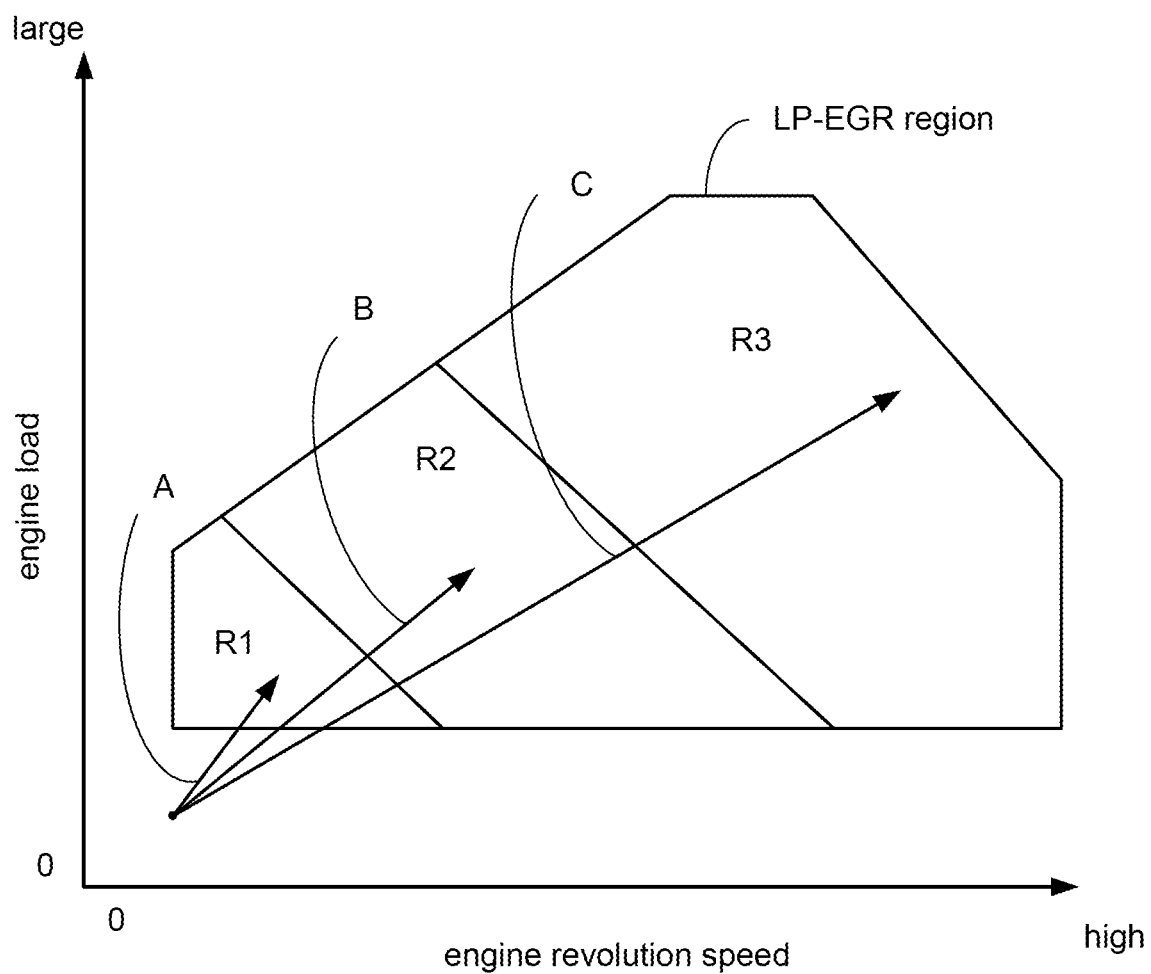
FIG. 3 is an explanatory drawing of a target EGR rate map according to the embodiment of the present invention.

At step S20, the engine controller 41 refers to the target EGR rate map illustrated in FIG. 3 to obtain the target EGR rate corresponding to the current engine operating point.

FIG. 3 is an explanatory drawing of the target EGR rate map in the LP-EGR unit 14 according to the embodiment.

The target EGR rate map is a map in which a target EGR rate is set in advance for an engine load and an engine revolution speed.

The EGR rate is a proportion of an EGR gas amount in a mixed gas introduced to the cylinder 7 of the engine 1. The target EGR rate is a target value of how much EGR gas amount is to be supplied at the current engine operating point.

In FIG. 3, the target EGR rate is divided into three regions of R1, R2, and R3, and the target EGR rates in the respective regions are set as R1=a [%], R2=b [%], and R3=c [%] and each of them fulfils a relation of a>b>c. That is, the higher the engine load and the engine revolution speed are, the smaller the target EGR rate is set.

This is because an increase in a fresh air amount suctioned into the cylinder 7 by supercharging of the turbo supercharger 21 is limited at a high load side of the engine 1 and it is necessary to generate more engine torques, and therefore, compared with a low load side, the target EGR rate is set to small within a range where knocking does not occur.

Figure 4:
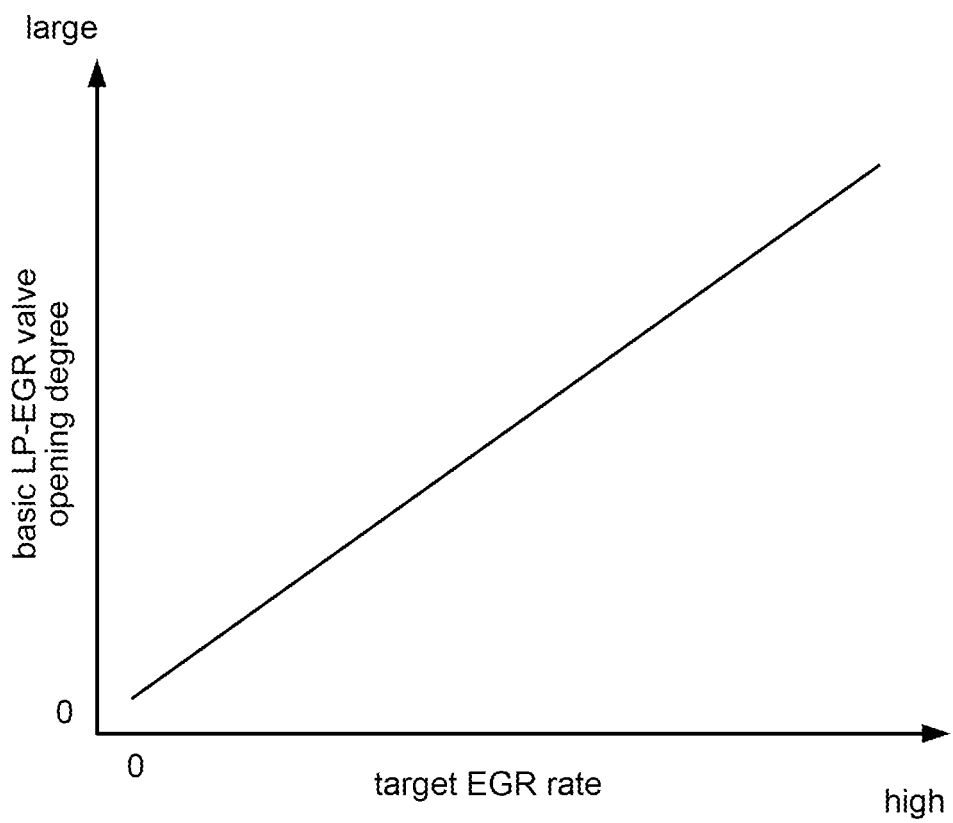
FIG. 4 is an explanatory drawing of a basic LP-EGR valve opening degree table according to the embodiment of the present invention.

Returning to FIG. 2, at step S30, the engine controller 41 refers to a basic LP-EGR valve opening degree table illustrated in FIG. 4 from the obtained target EGR rate to calculate a basic LP-EGR valve opening degree.

FIG. 4 is an explanatory drawing of the basic LP-EGR valve opening degree table in the LP-EGR unit 14 according to this embodiment.

The basic LP-EGR valve opening degree map is a table in which the basic LP-EGR valve opening degree with respect to the target EGR rate is set in advance.

The basic LP-EGR valve opening degree has its value set large as the target EGR rate increases. That is, it is because, in order to increase the EGR rate, the degree of opening of the LP-EGR valve 17 has to be increased.

Figure 5:
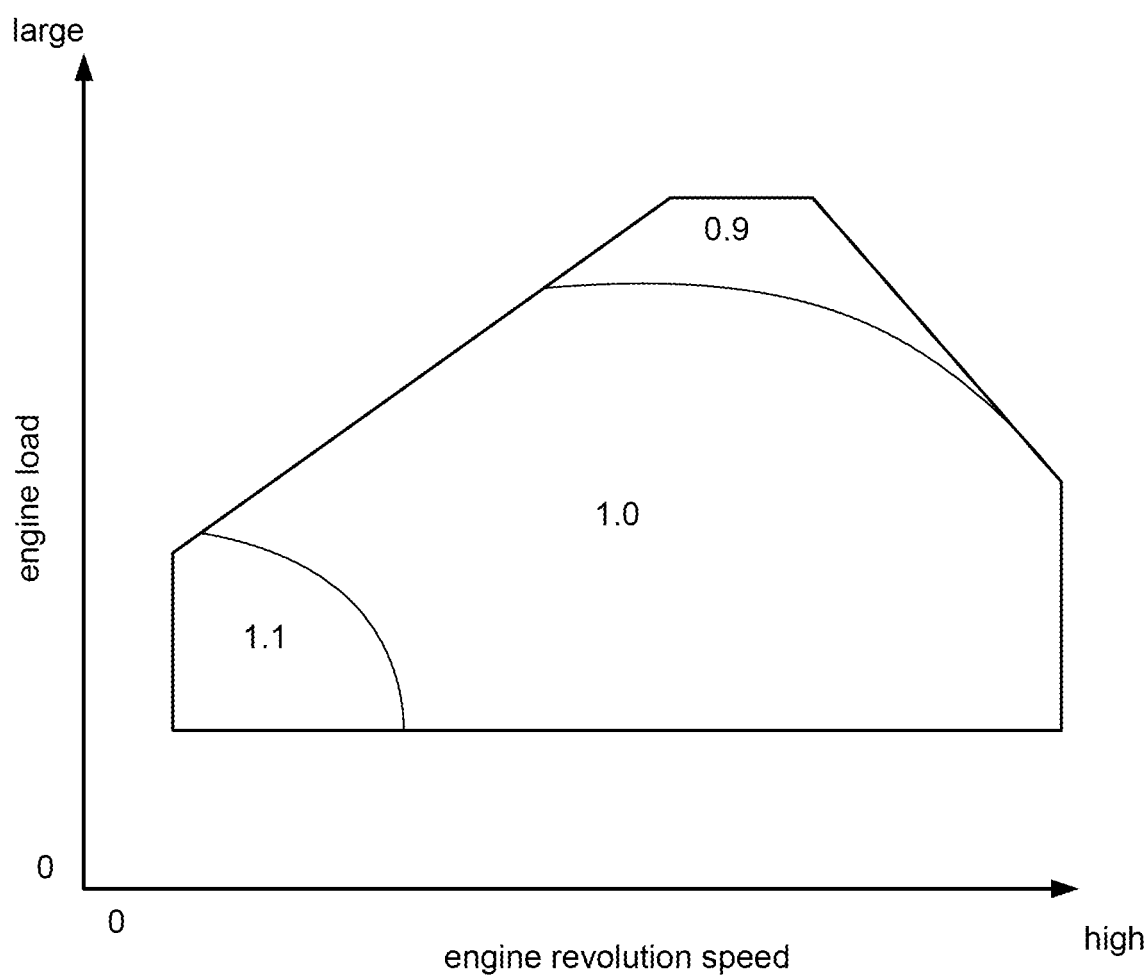
FIG. 5 is an explanatory drawing of a trimming coefficient map according to the embodiment of the present invention.

Returning to FIG. 2, at step S40, the engine controller 41 refers to a trimming coefficient map illustrated in FIG. 5, and a trimming coefficient corresponding to the current engine operating point is calculated.

FIG. 5 is an explanatory drawing of the trimming coefficient map in the LP-EGR unit 14 according to this embodiment.

The trimming coefficient map is a map in which trimming coefficients relative to the engine operating states of the engine are determined in advance. A region in the trimming coefficient map corresponds to a region where LP-EGR is permitted.

The trimming coefficient is a coefficient for correcting the degree of opening of the LP-EGR valve 17 on the basis of the engine operating state of the engine. In a region at a low revolution speed side and low load side in the LP-EGR region, a value of 1.1 that is larger than a trimming coefficient at the center is set. In a region at a high revolution speed side and high load side, a value of 0.9 that is smaller than the trimming coefficient at the center is set. Thus setting the trimming coefficient corrects the degree of opening of the LP-EGR valve 17 to each of a side that increases the target LP-EGR valve opening degree when the trimming coefficient is larger than 1.0 and to a side that decreases the target LP-EGR valve opening degree when the trimming coefficient is below 1.0.

More specifically, while the more an air intake quantity (that is, an engine load) increases, the larger the exhaust gas pressure in the upstream side of the EGR passage 15 becomes, to sufficiently generate a differential pressure, the exhaust gas pressure decreases at the low load side where the air intake quantity is relatively small to decrease the differential pressure. In view of this, while with the high rotation and high load, the flow rate becomes excessive to relatively increase the LP-EGR valve flow rate, at the low rotation and low load side, the LP-EGR valve flow rate relatively decreases. Therefore, they are corrected using the trimming coefficient.

Returning to FIG. 2, at step S50, the engine controller 41 calculates the target LP-EGR valve opening degree by multiplying the basic LP-EGR valve opening degree calculated at step S30 by the trimming coefficient calculated at step S40.

When it is determined that the LP-EGR flag is 0, that is, the engine is not in the LP-EGR region at step S10 described above, the engine controller 41 causes the procedure to transition to step S60 to set the target LP-EGR valve opening degree to zero. That is, the LP-EGR valve 17 is set to a fully-closed state.

After these step S50 and step S60, the engine controller 41 terminates this flowchart.

Next, the differential pressure device 50 according to this embodiment will be described.

As illustrated in FIG. 1, in this embodiment, the EGR passage 15 communicates with the exhaust pipe 11b in the downstream of the turbine 22 and the intake pipe 4a in the upstream of the compressor 23. Such a configuration ensures recirculating the exhaust gas without an effect of the supercharging pressure. Meanwhile, such a configuration decreases the differential pressure between an exhaust pipe pressure in the downstream of the turbine 22 and an intake pipe pressure in the upstream of the compressor 23, which is, for example, approximately 1 [kPa].

In the LP-EGR unit 14, there is generated a case where the differential pressure of the LP-EGR valve 17 is decreased at the low load side and the low revolution speed side of the engine 1 and the EGR rate cannot be increased.

Therefore, in this embodiment, the differential pressure device 50 is disposed in the intake pipe 4a in the upstream with respect to an outlet of the EGR passage 15 (a joining portion between the EGR passage 15 and the intake pipe 4a). The engine controller 41 controls the intake air pressure in the intake pipe 4a by controlling the differential pressure device 50. More specifically, operating the actuator 52 to control the metering valve 51 into the closed direction ensures changing the intake air pressure in the intake pipe 4a, and therefore, the LP-EGR valve differential pressure can be increased and the LP-EGR valve flow rate can be appropriately controlled.

Figure 6:
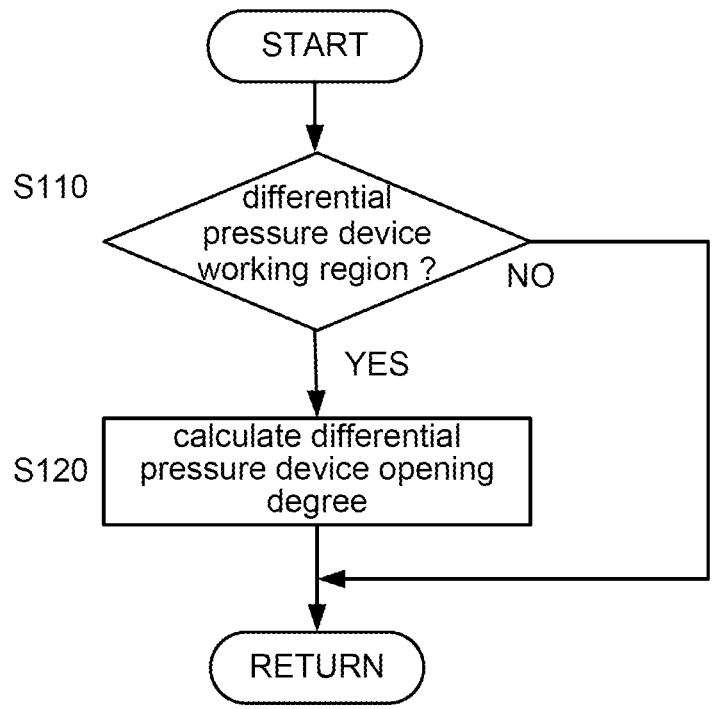
FIG. 6 is a flowchart of a control of a differential pressure device according to the embodiment of the present invention.

FIG. 6 is a flowchart of a control of the differential pressure device 50 performed by the engine controller 41 according to this embodiment. The flowchart illustrated in FIG. 6 is performed at a predetermined interval (for example, every 10 ms).

Figure 7:
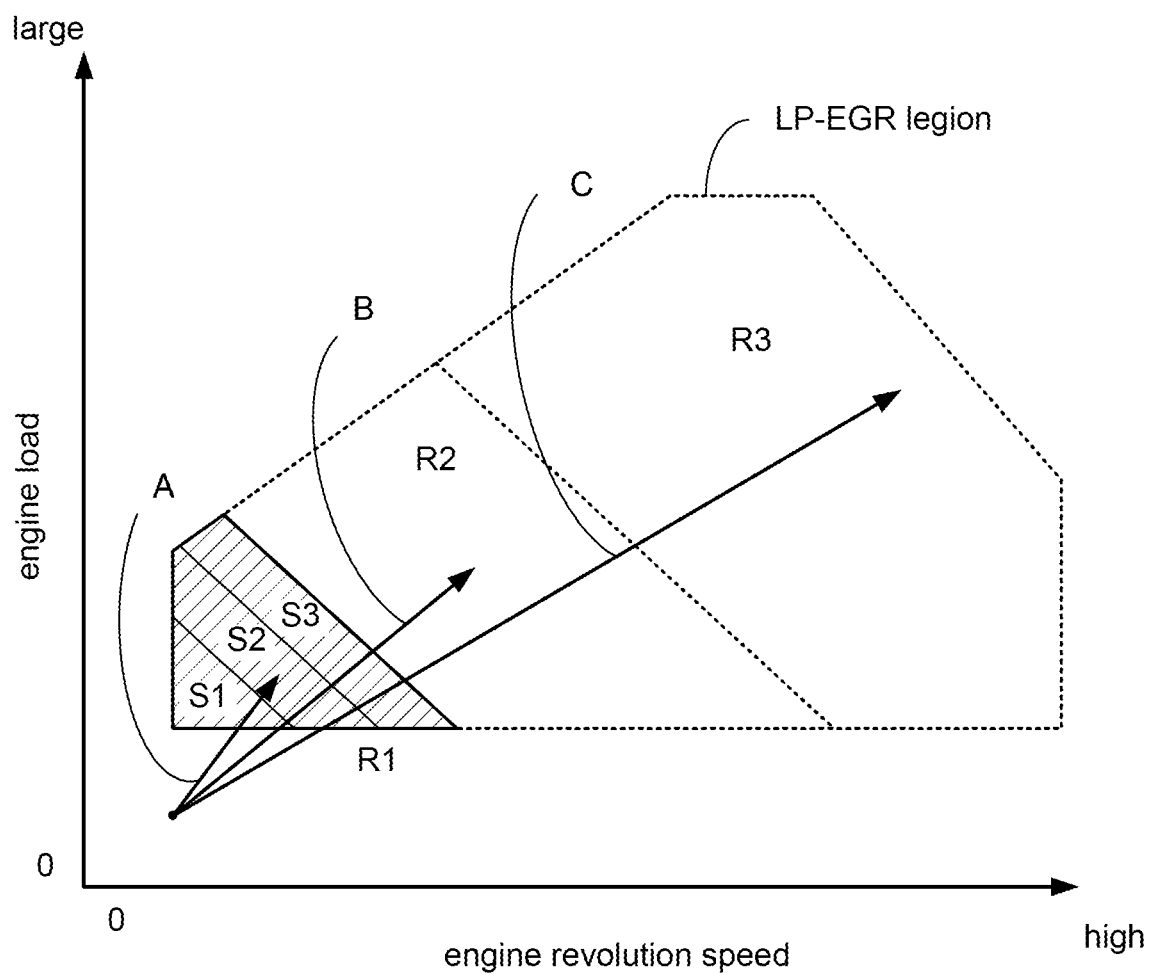
FIG. 7 is an explanatory drawing illustrating a differential pressure device opening degree map according to the embodiment of the present invention.

The engine controller 41 refers to the differential pressure device opening degree map illustrated in FIG. 7 at step S110 to determine whether the current operating point of the engine determined from the revolution speed Ne and the engine load of the engine is in a differential pressure device working region or not. The differential pressure device map illustrated in FIG. 7 illustrates the current operating point of the engine and the working region (indicated by hatching) of the differential pressure device, and their opening degrees.

When it is determined that the current operating point of the engine is in the differential pressure device working region at step S110, the procedure transitions to step S120. When the current operating point of the engine is not in the differential pressure device working region, the process by this flowchart is terminated without operating the differential pressure device 50.

At step S120, the engine controller 41 refers to the differential pressure device opening degree map illustrated in FIG. 7 to calculate the differential pressure device opening degree, that is, a degree of opening of the metering valve 51. Afterwards, the process by this flowchart is terminated.

FIG. 7 is an explanatory drawing illustrating the differential pressure device opening degree map according to this embodiment.

The differential pressure device opening degree map is a map in which the working region of the differential pressure device and the degree of opening of the metering valve 51 in the working region are set in advance with respect to the engine operating point determined by the engine load and the engine revolution speed.

With reference to FIG. 7, a region R1 where the target EGR rate is a [%] (that is, the EGR rate is maximum) in the target EGR rate map illustrated in FIG. 3 is indicated by hatching as the differential pressure device working region. In the differential pressure device working region, the respective degrees of opening of the metering valve 51 are set as S1, S2, and S3. These opening degrees are set to be increased as the engine revolution speed is large and the engine load is large. That is, the differential pressure device opening degrees fulfil a relation of S3>S2>S1.

When the engine load is large and the engine revolution speed is high (for example, the regions R2, R3), it is necessary to increase the intake air of the engine 1, and since the LP-EGR valve differential pressure at this time is sufficiently large, the differential pressure device 50 is not operated in order to reduce a pumping loss caused by the differential pressure device 50. Meanwhile, when the engine load and the engine revolution speed are low, the exhaust gas pressure is small, and therefore, there may be a case where, not only the LP-EGR valve differential pressure is decreased, but also an adverse current is generated caused by the negative differential pressure due to an effect by the pulsation of the exhaust gas of the engine 1.

Therefore, in order to prevent this, the differential pressure device 50 forms a throttle in the intake pipe 4a in the region R1 where the engine load and the engine revolution speed are low in the LP-EGR region to increase the LP-EGR valve differential pressure.

Next, a control of the LP-EGR valve differential pressure by the exhaust temperature will be described.

For example, the case where an acceleration of the vehicle causes the operating point of the engine 1 to change from a non-LP-EGR region to the LP-EGR region and the case where a deceleration of the vehicle causes the operating point of the engine 1 to change from the non-LP-EGR region to the LP-EGR region are considered. In such a case, the combustion state of the engine 1 is degraded to possibly cause knocking and the like because the LP-EGR valve differential pressure transitionally changes in association with the increase or decrease in the exhaust temperature of the engine 1, the LP-EGR valve differential pressure based on the LP-EGR valve opening degree controlled by the engine controller 41 diverges from the differential pressure based on the target LP-EGR valve opening degree, and therefore, the EGR rate fails to match the target value.

In contrast to this, it is possible to dispose a differential pressure sensor is between the upstream and the downstream of the LP-EGR valve 17 in order to detect the LP-EGR valve differential pressure and adjust the degree of opening of the metering valve 51 of the differential pressure device 50 on the basis of the differential pressure detected by the differential pressure sensor. However, there is a case where the pulsation of the exhaust gas pressure of the engine 1 varies an output of the differential pressure sensor to cause a failure in appropriately controlling the LP-EGR valve flow rate.

Therefore, this embodiment is configured to, as illustrated in FIG. 1, on the basis of the exhaust temperature obtained by the temperature sensor 48 detecting the exhaust temperature of the exhaust pipe 11b in the downstream of the main catalyst 13, obtain an LP-EGR valve upstream pressure to control the differential pressure device 50 using the LP-EGR valve upstream pressure. The exhaust temperature has a certain relation with the LP-EGR valve upstream pressure (or the LP-EGR valve differential pressure) but the pulsation by the exhaust gas pressure is not detected, thereby ensuring an appropriately controlled LP-EGR valve flow rate.

While the temperature sensor 48 is disposed in the downstream of the main catalyst 13, the main catalyst 13 has a large thermal capacity, and therefore, the exhaust temperature in the main catalyst 13 follows in a delayed manner (has a delay time until the temperature enters into an equilibrium state) in association with the change of the engine operating point. Therefore, when the engine operating point changes, with the control based on the exhaust temperature obtained by the temperature sensor 48, a calculation accuracy of the LP-EGR valve differential pressure is lowered in some cases.

Therefore, in this embodiment, it is configured that the control as described next controls the differential pressure device 50, thus controlling the EGR rate.

Figure 8:
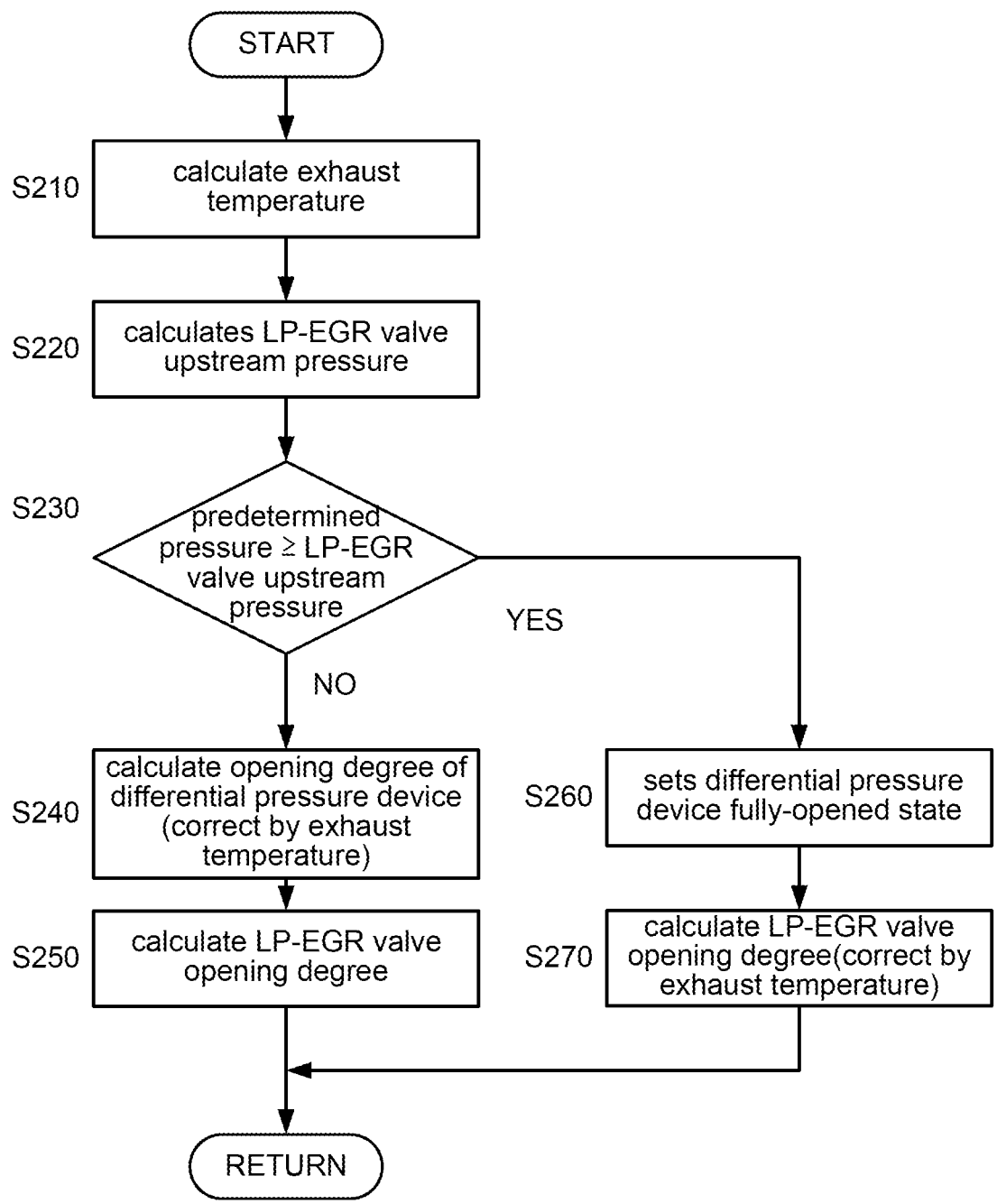
FIG. 8 is a flowchart of a control of an LP-EGR unit and the differential pressure device according to the embodiment of the present invention.

FIG. 8 is a flowchart of a control of the LP-EGR unit 14 and the differential pressure device 50 performed by the engine controller 41. The flowchart illustrated in FIG. 8 is performed at a predetermined interval (for example, every 10 ms) by the engine controller 41.

The engine controller 41 first obtains a signal from the temperature sensor 48 at step S210 to calculate an actual exhaust temperature of the exhaust pipe 11b.

Next, at step S220, the engine controller 41 calculates a current LP-EGR valve upstream pressure on the basis of the calculated exhaust temperature. The LP-EGR valve upstream pressure obtains an exhaust gas temperature map illustrated in FIG. 9 on the basis of the calculated exhaust temperature.

Figure 9:
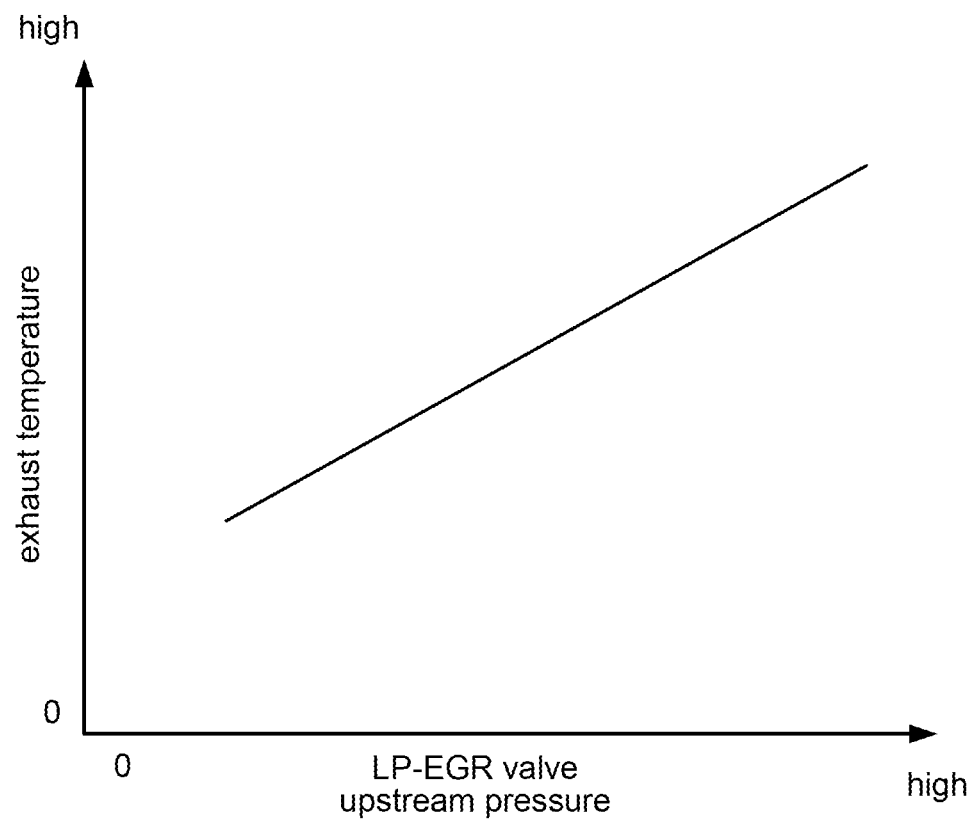
FIG. 9 is an explanatory drawing illustrating an exhaust gas temperature map according to the embodiment of the present invention.

FIG. 9 is an explanatory drawing illustrating the exhaust gas temperature map according to this embodiment.

The exhaust gas temperature map is a map in which a relation between the exhaust temperature and the LP-EGR valve upstream pressure are determined in advance. As illustrated in FIG. 9, it is set such that the LP-EGR valve upstream pressure is increased as the exhaust temperature increases. In the engine 1, the exhaust temperature and the exhaust gas pressure have a certain relation due to a shape of the exhaust pipe 11b and the main catalyst 13, and the LP-EGR valve upstream pressure can be calculated from this relation.

Returning to FIG. 8, at step S230, the engine controller 41 determines whether the calculated LP-EGR valve upstream pressure is equal to or larger than a predetermined pressure or not. The predetermined pressure is a criterion for determining whether to perform a correction by the differential pressure device 50 or not on the control of the EGR rate by the LP-EGR valve opening degree according to the embodiment.

In this embodiment, as one example, the predetermined pressure is set to 5 [kPa]. This predetermined pressure is determined, when the engine operating point is changed from one state to another state, on the basis of the pressure with which the LP-EGR valve differential pressure at an engine operating point in the other state at the destination of change is sufficient. More specifically, the predetermined pressure is a pressure with which the differential pressure is not reversed even by the pulsation of the exhaust gas pressure and is a pressure set by conformity corresponding to specifications of a vehicle to which the engine 1 is applied.

When it is determined that the LP-EGR valve upstream pressure is less than the predetermined pressure, the procedure transitions to step S240. When the LP-EGR valve upstream pressure is determined to be equal to or larger than the predetermined pressure, the procedure transitions to step S260.

It should be noted that the determination at step S230 may be performed on the basis of a comparison between the LP-EGR valve differential pressure and the predetermined pressure, not a comparison between the LP-EGR valve upstream pressure and the predetermined pressure. The LP-EGR valve differential pressure is a difference between the LP-EGR valve upstream pressure and the pressure of the intake pipe 4a.

Figure 10:
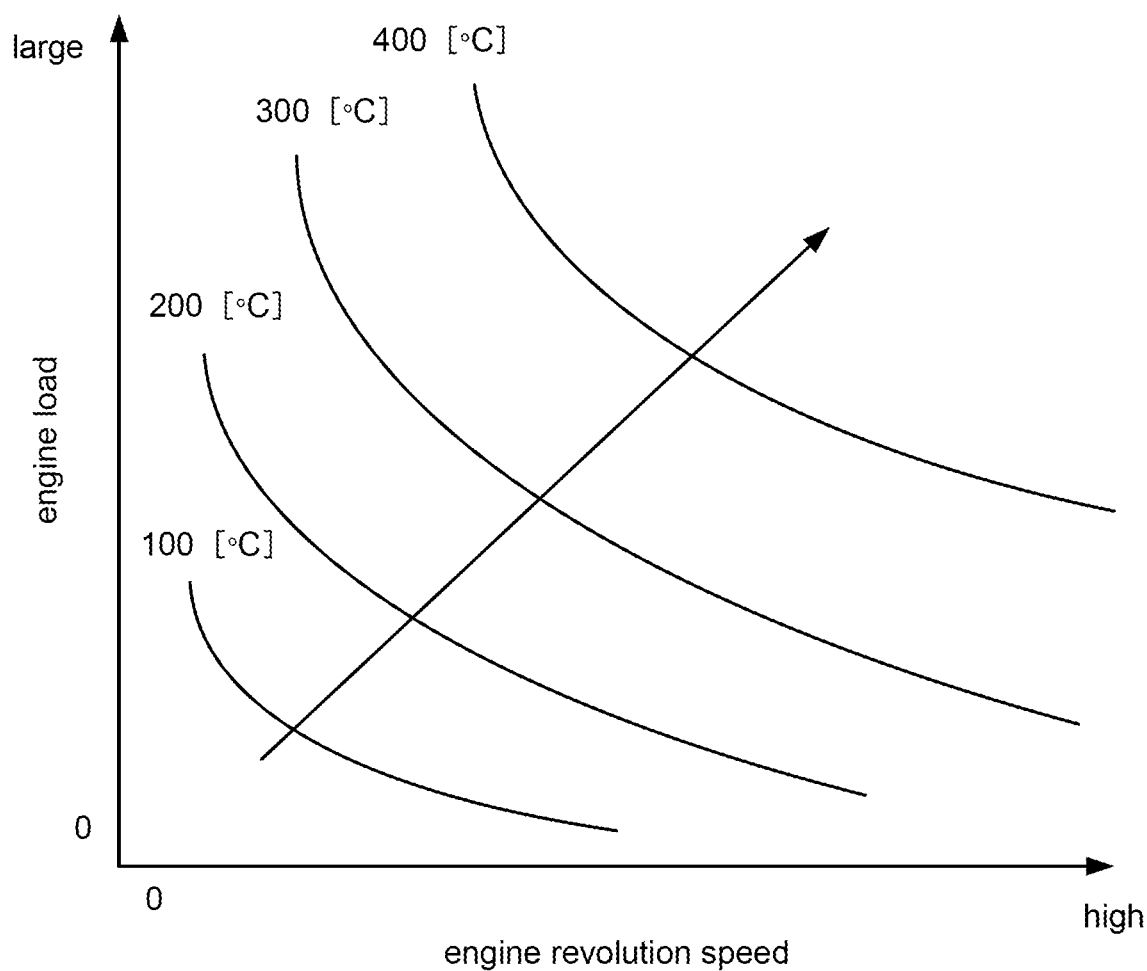
FIG. 10 is an explanatory drawing illustrating a base exhaust gas temperature map according to the embodiment of the present invention.
Figure 11:
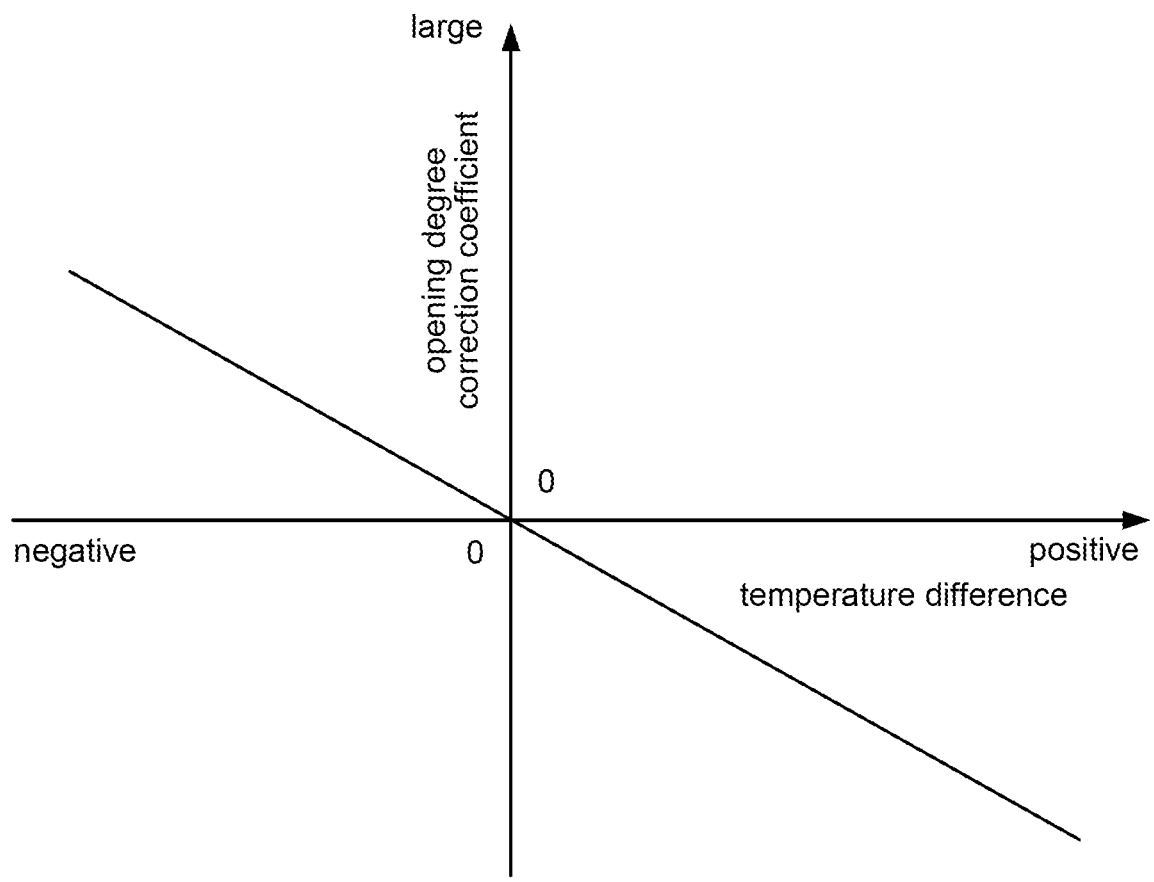
FIG. 11 is an explanatory drawing illustrating an opening degree correction coefficient map of a metering valve according to the embodiment of the present invention.

At step S240, the engine controller 41 corrects a degree of opening of the differential pressure device 50. specifically, the base exhaust temperature based on the engine operating point is calculated from the base exhaust gas temperature map illustrated in FIG. 10, and the correction is performed by the correction coefficient map illustrated in FIG. 11 on the basis of a temperature difference with an actual exhaust temperature obtained by the temperature sensor 48.

The engine controller 41 calculates the base exhaust temperature with reference to the base exhaust gas temperature map illustrated in FIG. 10. The engine controller 41 calculates the correction coefficient with reference to the opening degree correction map illustrated in FIG. 11 on the basis of the temperature difference obtained by a difference between the calculated base exhaust temperature and the exhaust temperature detected by the temperature sensor 48. The engine controller 41 calculates a degree of opening of the metering valve 51 of the differential pressure device 50 on the basis of a sum of the differential pressure device opening degree calculated in FIG. 7 described above and the correction coefficient calculated in FIG. 11.

FIG. 10 is an explanatory drawing illustrating the base exhaust gas temperature map of the embodiment.

The base exhaust gas temperature map is a map in which the base exhaust temperature is set with respect to the operating point in the engine in advance. The base exhaust temperature is an estimated value of the exhaust temperature generated corresponding to an operating point of the engine. The higher the engine load and the engine revolution speed are, the higher temperature the base exhaust temperature is set to.

FIG. 11 is an explanatory drawing illustrating the opening degree correction coefficient map of the metering valve 51 in the differential pressure device 50 according to this embodiment.

The opening degree correction coefficient map is a map in which an opening degree correction coefficient is set with respect to a temperature difference obtained by subtracting the actual exhaust temperature from the base exhaust temperature in advance.

The opening degree correction coefficient is set to be a small value (a negative value) as the temperature difference between the actual exhaust temperature and the base exhaust temperature is in a positive value and large, and is set to be a large value (a positive value) as the temperature difference is in a negative value and small. It should be noted that when the temperature difference is zero, the opening degree correction coefficient is zero.

Thus, correcting a degree of opening of the metering valve 51 calculated in FIG. 7 by the opening degree correction coefficient corresponding to the temperature difference ensures correcting a response delay of the target LP-EGR opening degree with respect to the actual LP-EGR valve differential pressure caused by a response delay of the exhaust temperature in the temperature sensor 48 when, for example, the engine operating point transitions from the non-LP-EGR region to the LP-EGR region.

It should be noted that, in the embodiment, an upper limit of the LP-EGR valve differential pressure corrected by the differential pressure device 50 is the above-described predetermined pressure. As described later, when the correction by the differential pressure device 50 cannot achieve the target EGR rate based on the LP-EGR valve upstream pressure, the correction is performed by controlling the LP-EGR valve opening degree.

Returning to FIG. 8, next, at step S250, the engine controller 41 sets the LP-EGR valve opening degree on the basis of the target EGR rate based on the engine operating point on the basis of the flowchart in FIG. 2 described above.

At this time, the differential pressure device 50 performs a correction so as to achieve the predetermined pressure (so as to generate the LP-EGR valve differential pressure corresponding to the predetermined pressure). When the LP-EGR valve upstream pressure corresponding to the target LP-EGR valve opening degree based on the engine operating point (that is, the LP-EGR upstream pressure when the exhaust temperature enters into the equilibrium state and the LP-EGR valve differential pressure when the differential pressure device is fully opened in the equilibrium state) is larger than the LP-EGR valve differential pressure (that is, the predetermined pressure) corrected by the control of the differential pressure device 50, the target LP-EGR valve opening degree is controlled by the correction value based on a difference between the LP-EGR valve upstream pressure and the predetermined pressure based on the engine operating point.

On the other hand, when it is determined that the LP-EGR valve upstream pressure is equal to or larger than the predetermined pressure at step S230, the procedure transitions to step S260. At step S260, the engine controller 41 sets the differential pressure device to be the fully opened state (opening degree 0 [deg]) such that the control by the differential pressure device 50 is not performed.

This is because, when the LP-EGR valve upstream pressure is equal to or larger than the predetermined pressure, it is in the state where the target EGR rate can be achieved by the calculated target LP-EGR valve opening degree even though the control by the differential pressure device 50 is not performed.

Next, the procedure transitions to step S270, the engine controller 41 sets the target LP-EGR valve opening degree obtained by performing the correction by the temperature difference is set for the LP-EGR valve opening degree set on the basis of the flowchart in FIG. 2 described above.

This correction is performed similarly to the correction of the differential pressure device 50 described above. That is, the temperature difference between the exhaust temperature obtained by the temperature sensor 48 and the base exhaust temperature calculated from the base exhaust gas temperature map in FIG. 10 on the basis of the engine operating point is calculated and the target LP-EGR valve opening degree is controlled on the basis of the correction amount calculated using the map and the like from the calculated temperature difference. This correction amount is set to be a large value (a positive value) as the temperature difference between the actual exhaust temperature and the base exhaust temperature is in a positive value and large, and is set to be a small value (a negative value) as the temperature difference is in a negative value and small. That is, the larger the temperature difference becomes, the larger the correction amount of the LP-EGR valve opening degree becomes. It should be noted that when the temperature difference is zero, the correction coefficient is zero. Adding this correction coefficient to the LP-EGR valve opening degree ensures resolving the response delay relative to the base exhaust temperature of the actual exhaust temperature obtained by the temperature sensor 48 with the LP-EGR valve opening degree.

On the basis of thus set target LP-EGR valve opening degree and differential pressure device opening degree, the engine controller 41 adjusts the motor 18 and the actuator 52 to control the EGR rate.

Next, a specific control according to the embodiment will be described.

Figure 12:
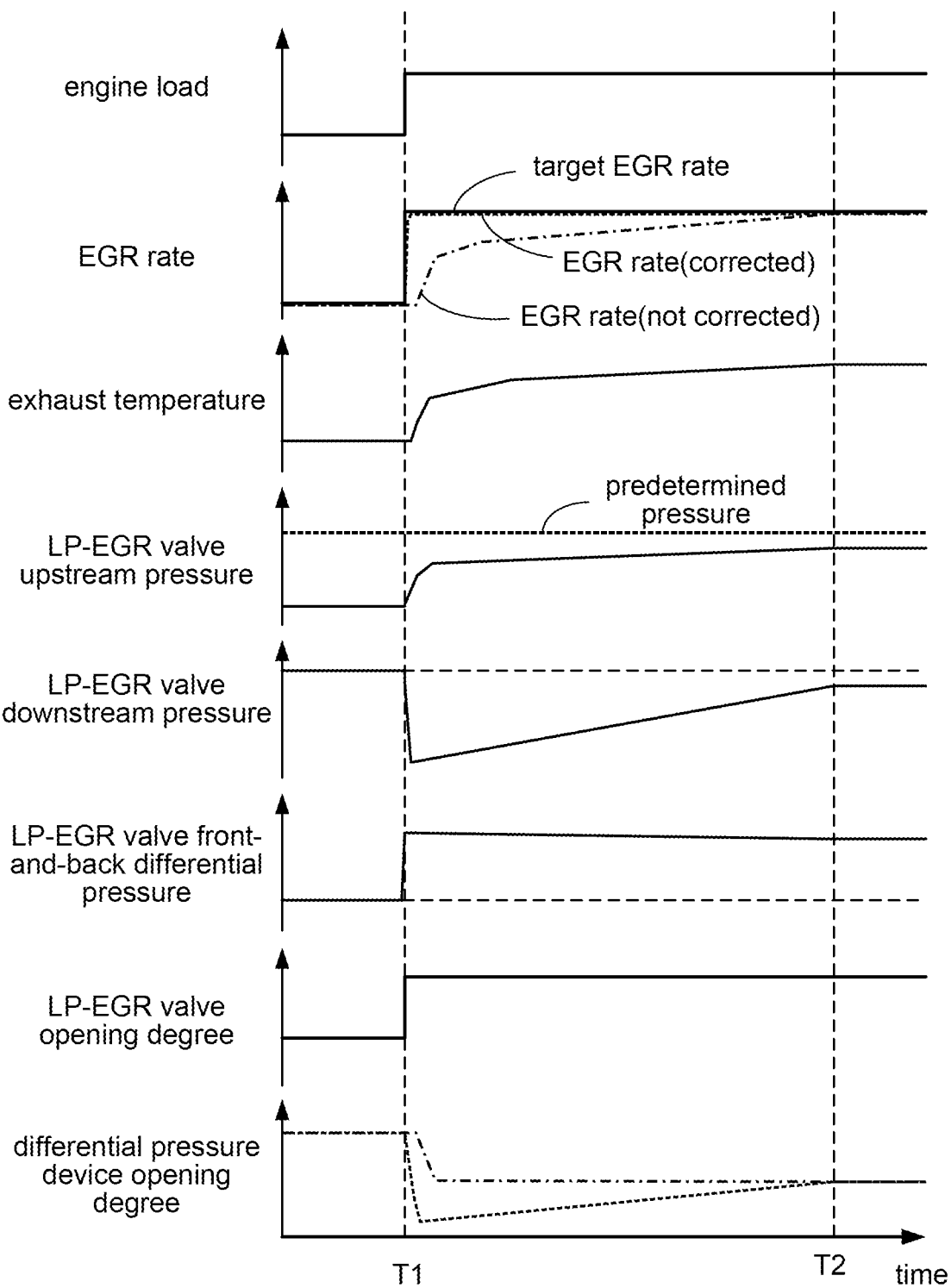
FIG. 12 is a timing chart illustrating an exemplary engine operating state of this embodiment according to the embodiment of the present invention.

FIG. 12 is a timing chart illustrating an exemplary engine operating state according to this embodiment. FIG. 12 is one example of the case where the engine operating point changes from the non-LP-EGR region to the LP-EGR region (the region R1 in FIG. 3) that is low in rotation and low in load, and corresponds to an arrow A in FIG. 7.

FIG. 12 illustrates, from the top, the engine load, the EGR rate, the exhaust temperature, the LP-EGR valve upstream pressure, the LP-EGR valve downstream pressure, the LP-EGR valve differential pressure, the LP-EGR valve opening degree, and the differential pressure device opening degree as a timing chart, each with a time period as a horizontal axis.

In this timing chart, the engine load increases at a time point T1, and as the arrow A illustrated in FIG. 7, is changed from the non-LP-EGR region to the LP-EGR region.

While at this time, the exhaust temperature in the downstream of the main catalyst 13 is increased in association with the increase of the engine load, the exhaust temperature is increased in association with a delay with respect to the increase of the load, and therefore, the exhaust temperature detected by the temperature sensor 48 is increased in a little delayed manner from the time point T1 until entering into the equilibrium state. In view of this, the LP-EGR valve upstream pressure calculated on the basis of the exhaust temperature is increased in a delayed manner from the time point T1.

The case where the correction of the LP-EGR valve differential pressure by the differential pressure device 50 is not performed in this situation is assumed. In this case, the differential pressure device opening degree is controlled as indicated by the one dot chain line in the drawing. This causes the actual EGR rate to be changed in a delayed manner with respect to the target EGR rate as indicated by the one dot chain line in the drawing, thereby decreasing the EGR gas amount.

Meanwhile, in this embodiment, by performing the control as in FIG. 8 described above, it is controlled to decrease the actual exhaust temperature with respect to the base exhaust temperature and correct the differential pressure device opening degree to be further slightly closed state on the basis of the opening degree correction coefficient map in FIG. 11 when the LP-EGR valve upstream pressure is less than the predetermined pressure (indicated by the dotted line). This increases the change of the differential pressure device opening degree with respect to the increase delay of the actual exhaust temperature as indicated by the dotted line in the drawing. With this correction, it is possible to significantly lower the LP-EGR valve downstream pressure to ensure the LP-EGR valve differential pressure. As a result, without correcting the degree of opening of the LP-EGR valve 17 on the basis of the exhaust temperature, the actual EGR rate can be changed following the target EGR rate as indicated by the dotted line.

Afterwards, when the exhaust temperature in the downstream of the main catalyst 13 is sufficiently increased in association with the engine load increase (a time point T2), the exhaust temperature enters into the equilibrium state and the temperature difference of the actual exhaust temperature with respect to the base exhaust temperature is eliminated, thereby ensuring controlling the EGR rate to the target EGR without correcting the degree of opening of the differential pressure device 50.

Figure 13:
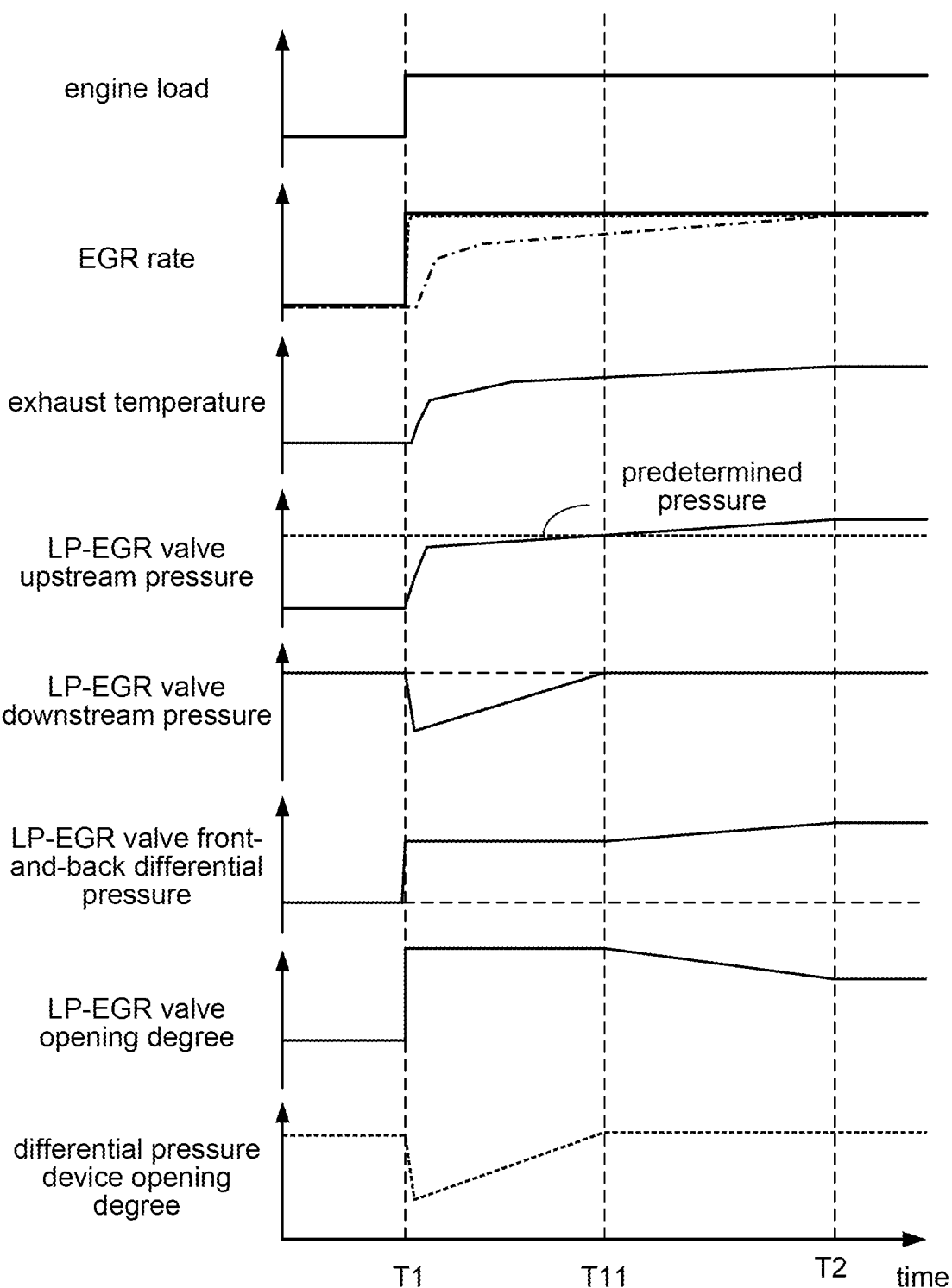
FIG. 13 is a timing chart illustrating another exemplary engine operating state of this embodiment according to the embodiment of the present invention.

FIG. 13 is a timing chart illustrating another exemplary engine operating state according to this embodiment. FIG. 13 is one example of a case where the engine operating point is changed from the non-LP-EGR region to the LP-EGR region (the region R2 in FIG. 3) and corresponds to an arrow B in FIG. 7.

In the example illustrated in FIG. 13, similarly to FIG. 12 described above, it is controlled to decrease the actual exhaust temperature with respect to the base exhaust temperature and correct the differential pressure device opening degree to be further slightly closed state on the basis of the opening degree correction coefficient map in FIG. 10 when the engine load is increased at the time point T1 and the LP-EGR valve upstream pressure is less than the predetermined pressure. With such a control, the differential pressure device opening degree is corrected with respect to an increase delay of the actual exhaust temperature as indicated by the dotted line in the drawing.

At this time, as described above, the differential pressure device 50 performs the correction so as to achieve the predetermined pressure (so as to generate the LP-EGR valve differential pressure corresponding to the predetermined pressure). However, the differential pressure runs short with the predetermined pressure (5 [kPa]) by the control of the differential pressure device 50 with respect to the LP-EGR valve differential pressure (for example, 7 [kPa]) corresponding to the target EGR rate based on the engine operating point, thereby failing to achieve the target EGR rate. In such a case, by controlling the LP-EGR valve opening degree, it is controlled to the valve opening degree that achieves the target EGR rate. More specifically, the LP-EGR valve opening degree is increased by an amount of the differential pressure running short with respect to the predetermined pressure to control to increase the EGR rate. Thus controlling the LP-EGR valve opening degree ensures changing the EGR rate to follow the actual exhaust temperature as illustrated by the dotted line.

Afterwards, at a time point T11, the LP-EGR valve upstream pressure based on the exhaust temperature is increased larger than the predetermined pressure. In this case, the determination at step S230 in FIG. 8 described before is YES, and the processes at step S260 and step S270 control the differential pressure device opening degree to be fully open and the correction of the LP-EGR valve opening degree is performed by the temperature difference. Such a control corrects the LP-EGR valve opening degree with respect to the response delay of the actual exhaust temperature.

Afterwards, when the exhaust temperature enters into the equilibrium state by the increase of the exhaust temperature (the time point T2), the LP-EGR valve upstream pressure also enters into the equilibrium state and the EGR rate follows the target EGR.

Figure 14:
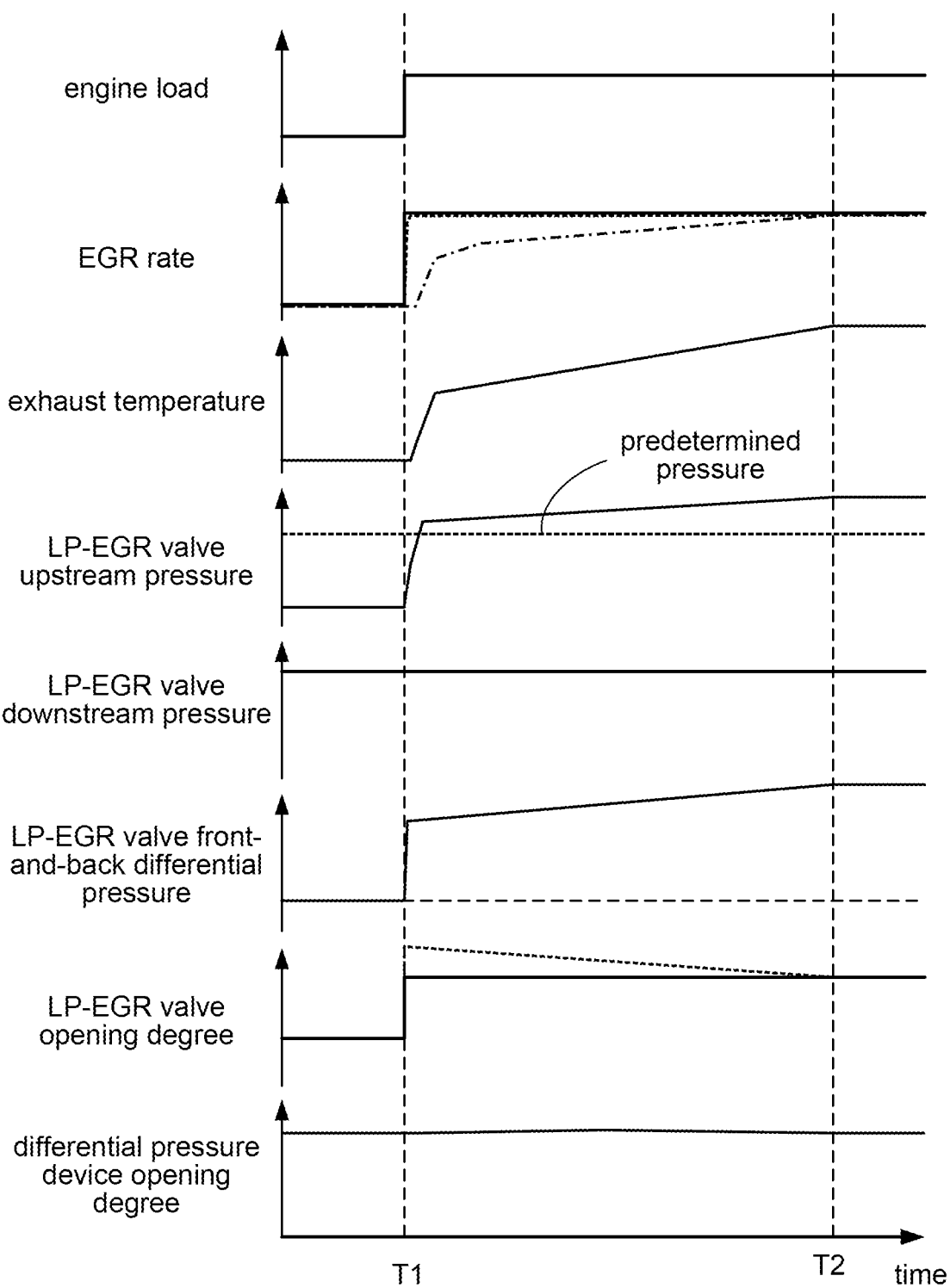
FIG. 14 is a timing chart illustrating another exemplary engine operating state of this embodiment according to the embodiment of the present invention.

FIG. 14 is a timing chart illustrating another example of the engine operating state according to this embodiment. FIG. 14 is one example of the case where the engine operating point is changed from the non-LP-EGR region to the LP-EGR region (the region R3 in FIG. 3) and corresponds to the arrow C in FIG. 7.

The example illustrated in FIG. 14 is the case where the engine load is increased at the time point T1 and the LP-EGR valve upstream pressure is increased larger than the predetermined pressure, that is, the case where the exhaust gas pressure is sufficiently large by the increase of the intake volume due to the large engine load. In such a case, the determination at step S230 in FIG. 8 is YES, and a control that fully opens the differential pressure device 50 that causes a pumping loss and achieves the target EGR rate by the control of the LP-EGR valve opening degree only is performed.

Specifically, the temperature difference between the exhaust temperature obtained by the temperature sensor 48 and the base exhaust temperature calculated from the base exhaust gas temperature map in FIG. 10 on the basis of the engine operating point is calculated, the correction value is calculated using the map or the like from the calculated temperature difference, and the target LP-EGR valve opening degree is corrected on the basis of this correction value. The correction value of the LP-EGR valve opening degree is determined to be a value that resolves the response delay caused by the temperature difference between the actual exhaust temperature and the base exhaust temperature and the correction value is set to be small as the actual exhaust temperature approaches the equilibrium state (as the temperature difference decreases). This increases the change of the LP-EGR valve opening degree with respect to the increase delay of the actual exhaust temperature as indicated by the dotted line in the drawing. This LP-EGR valve opening degree correction ensures compensating for a shifted amount of the LP-EGR valve differential pressure, and the actual EGR rate can be changed to follow the target EGR rate as indicated by the dotted line.

Afterwards, when the exhaust temperature enters into the equilibrium state due to the increase of the exhaust temperature (the time point T2), the LP-EGR valve upstream pressure enters into the equilibrium state and the EGR rate follows the target EGR.

Performing such a control performs the correction with the differential pressure device 50 and the LP-EGR valve 17 in a response time until the exhaust temperature detected by the temperature sensor 48 enters into the equilibrium state, and thus, the LP-EGR valve differential pressure can be appropriately controlled, thereby ensuring causing the EGR rate to follow the target EGR rate.

As described above, in the embodiment according to the present invention, it is configured to include the LP-EGR valve 17 disposed in the EGR passage 15 that circulates a part of the exhaust gas of the exhaust pipe 11b in the intake pipe 4a as the EGR gas and adjusts the EGR gas amount flowing in the EGR passage 15 when the engine 1 is in the LP-EGR region, the differential pressure device 50 disposed in the intake pipe 4a and adjusts the differential pressure of the LP-EGR valve, and the engine controller 41 (the control unit) that controls the LP-EGR valve 17 and the differential pressure device 50. The engine controller 41 switches whether to adjust the EGR gas amount using the LP-EGR valve 17 and the differential pressure device 50 or to adjust the EGR gas amount using the LP-EGR valve 17 only on the basis of the exhaust gas pressure of the inlet portion of the EGR passage 15. The exhaust gas pressure at the inlet portion of the EGR passage 15 is, for example, calculated from the exhaust temperature of the exhaust pipe 11b.

In this embodiment, such a configuration can control the EGR rate to be the target EGR rate on the basis of the exhaust temperature obtained by the temperature sensor 48, and therefore, the EGR rate can be controlled without an effect of the exhaust gas pulsation of the engine 1.

Furthermore, in this embodiment, when the exhaust gas pressure thus calculated is smaller than the predetermined pressure, the EGR gas amount is adjusted using the LP-EGR valve 17 and the differential pressure device 50, and when exhaust gas pressure is equal to or larger than the predetermined pressure, the EGR gas amount is adjusted using the LP-EGR valve 17 only. Therefore, when the LP-EGR valve differential pressure is small, the differential pressure can be controlled by the differential pressure device 50, and when the LP-EGR valve differential pressure is large, the pumping loss by the differential pressure device 50 can be eliminated.

In this embodiment, when the exhaust gas pressure is smaller than the predetermined pressure, as the temperature difference between the base exhaust temperature determined from the engine operating point and the actual exhaust temperature increases, the correction amount of the degree of opening of the differential pressure device 50 is increased. Therefore, the EGR rate can be controlled to be the target EGR rate eliminating the effect caused by the response delay of the exhaust temperature detected by the temperature sensor 48.

In this embodiment, when the exhaust gas pressure is equal to or larger than the predetermined pressure, as the temperature difference between the base exhaust temperature determined by the engine operating point and the actual exhaust temperature increases, the correction amount of the LP-EGR valve opening degree is increased. Therefore, the EGR rate can be controlled to be the target EGR rate eliminating the effect caused by the response delay of the exhaust temperature detected by the temperature sensor 48 and eliminating the effect of the pumping loss by the differential pressure device 50.

In this embodiment, when the exhaust gas pressure is smaller than the predetermined pressure and when the exhaust gas pressure based on the base exhaust temperature calculated on the basis of the engine operating point is equal to or larger than the predetermined pressure, the LP-EGR valve opening degree is controlled on the basis of the LP-EGR valve differential pressure corrected by the differential pressure device. This ensures controlling the EGR rate to be the target EGR rate by considering the pumping loss and controlling the LP-EGR valve opening degree in the situation where the differential pressure runs short with the LP-EGR valve differential pressure corrected by the differential pressure device 50.

In this embodiment, the exhaust temperature is the exhaust temperature in the downstream of an exhaust system component (for example, a component having a large thermal capacity, such as a pipe of the main catalyst 13 and the exhaust pipe 11b) disposed in the downstream with respect to the inlet portion of the EGR passage 15 in the exhaust pipe 11b. Therefore, the EGR rate can be controlled without an effect of the exhaust gas pulsation of the engine 1.

While in the embodiment according to the present invention described above, the configuration in which the LP-EGR unit is applied in a gasoline engine has been described, it is not limited to this case but may be a configuration in which the LP-EGR unit is applied in a diesel engine.

While in the example illustrated in FIGS. 13 to 15, the example in which the engine operating point is changed from a small side to a large side, and thus, is changed from the non-LP-EGR region to the LP-EGR region, it is not limited to this. Also in the case where the engine operating point, that is, the engine load and the engine revolution speed is changed from a high side to a small side, and thus, is changed from the non-LP-EGR region to the LP-EGR region, a similar control is performed. In this case, the actual exhaust temperature obtained by the temperature sensor 48 is changed from a state of being higher than the base temperature to the equilibrium state, and therefore, the differential pressure device 50 and the LP-EGR valve opening degree can be corrected corresponding to this change.

The invention claimed is:

1. An EGR control method, the method comprising:
providing an internal combustion engine that comprises an intake pipe, an exhaust pipe, and an EGR passage circulating a part of an exhaust gas of the exhaust pipe into the intake pipe as an EGR gas;
providing an EGR valve in the EGR passage, the EGR valve configured to adjust an EGR gas amount flowing in the EGR passage when the engine is in an EGR region;
providing a differential pressure device in the intake pipe, the differential pressure device configured to adjust a front-and-back differential pressure of the EGR valve;
determining whether or not an exhaust gas pressure of an inlet portion of the EGR passage is equal to or larger than a predetermined pressure;
in response to determining that the exhaust gas pressure is equal to or larger than the predetermined pressure, fully opening the differential pressure device and controlling an opening of the EGR valve according to a target EGR rate that is set to increase as an engine revolution speed and an engine load increase; and
in response to determining that the exhaust gas pressure is less than the predetermined pressure, controlling an opening of the differential pressure device according to an opening degree that is set to increase as the engine revolution speed and the engine load increases and controlling the opening of the EGR valve according to the target EGR rate.

2. The EGR control method according to claim 1, further comprising:
calculating a temperature difference obtained by subtracting an actual exhaust temperature from a base exhaust temperature determined from an engine operating point; and
when the exhaust gas pressure is smaller than the predetermined pressure, correcting the opening degree of the differential pressure device to decrease as the temperature difference increases in a positive value and to increase as the temperature difference increases in a negative value.

3. The EGR control method according to claim 1, further comprising:
    calculating a temperature difference obtained by subtracting an actual exhaust temperature from a base exhaust temperature determined from an engine operating point; and
        when the exhaust gas pressure is equal to or larger than the predetermined pressure, correcting an opening degree of the EGR valve to decrease as the temperature difference increases in a positive value and to increase as the temperature difference increases in a negative value.

4. The EGR control method according to claim 1, further comprising:
    when an exhaust gas pressure based on a base exhaust temperature calculated on the basis of an engine operating point is equal to or larger than the predetermined pressure, setting an opening degree of the EGR valve based on a front-and-back differential pressure of the EGR valve corrected by the differential pressure device.

5. The EGR control method according to claim 1, further comprising:
    calculating the exhaust gas pressure of the inlet portion of the EGR passage based on an actual exhaust temperature of the exhaust pipe; and wherein:
    the actual exhaust temperature is an exhaust temperature downstream of the inlet portion of the inlet portion of the EGR passage in the exhaust pipe.

6. An EGR controller for a system that comprises an internal combustion engine comprising an intake pipe, an exhaust pipe, and an EGR passage circulating a part of an exhaust gas of the exhaust pipe in the intake pipe as an EGR gas; an EGR valve in the EGR passage, the EGR valve configured to adjust an EGR gas amount flowing in the EGR passage when the engine is in an EGR region; a differential pressure device in the intake pipe, the differential pressure device configured to adjust a front-and-back differential pressure of the EGR valve; the EGR controller comprising:
    a control unit configured to:
        determine whether or not an exhaust gas pressure of an inlet portion of the EGR passage is equal to or larger than a predetermined pressure,
        in response to determining that the exhaust gas pressure is equal to or larger than the predetermined pressure, fully open the differential pressure device and control an opening of the EGR valve according to a target EGR rate that is set to increase as an engine revolution speed and an engine load increase, and
        in response to determining that the exhaust gas pressure is less than the predetermined pressure, control an opening of the differential pressure device according to an opening degree that is set to increase as the engine revolution speed and the engine load increases and control the opening of the EGR valve according to the target EGR rate.

7. The EGR control method according to claim 6, wherein the control unit is further configured to:
    calculate a temperature difference obtained by subtracting an actual exhaust temperature from a base exhaust temperature determined from an engine operating point; and
    correct an opening degree of the EGR valve to decrease as the temperature difference increases in a positive value and to increase as the temperature difference increases in a negative value.

8. The EGR controller according to claim 6, wherein the control unit is further configured to:
    calculate a temperature difference obtained by subtracting an actual exhaust temperature from a base exhaust temperature determined from an engine operating point; and
    when the exhaust gas pressure is smaller than the predetermined pressure, correct the opening degree of the differential pressure device to decrease as the temperature difference increases in a positive value and to increase as the temperature difference increases in a negative value.

* * * * *